United States Patent
Garcia (10) Patent No.: US 11,258,256 B2
(45) Date of Patent: Feb. 22, 2022

(54) WIND POWER PLANT WITH IMPROVED RISE TIME

(71) Applicant: VESTAS WIND SYSTEMS A/S, Aarhus N (DK)

(72) Inventor: Jorge Martinez Garcia, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1378 days.

(21) Appl. No.: 15/039,391

(22) PCT Filed: Nov. 6, 2014

(86) PCT No.: PCT/DK2014/050366
§ 371 (c)(1),
(2) Date: May 25, 2016

(87) PCT Pub. No.: WO2015/078473
PCT Pub. Date: Jun. 4, 2015

(65) Prior Publication Data
US 2017/0025855 A1    Jan. 26, 2017

(30) Foreign Application Priority Data
Nov. 28, 2013   (DK) .......................... PA 2013 70730

(51) Int. Cl.
*H02J 3/16*        (2006.01)
*H02J 3/38*        (2006.01)
(Continued)

(52) U.S. Cl.
CPC ............. *H02J 3/16* (2013.01); *F03D 9/257* (2017.02); *H02J 3/38* (2013.01); *H02J 3/386* (2013.01);
(Continued)

(58) Field of Classification Search
None
See application file for complete search history.

(56) References Cited

U.S. PATENT DOCUMENTS 4,380,737  A    4/1983  Sanders
2007/0233406 A1   10/2007  Delmerico
(Continued)

FOREIGN PATENT DOCUMENTS

CN    102900602 A    1/2013
CN    103119818 A    5/2013
(Continued)

OTHER PUBLICATIONS

Danish Search Report for PA 2013 70730, dated Jul. 14, 2014.
(Continued)

*Primary Examiner* — Mohammad Ali
*Assistant Examiner* — Saad M Kabir
(74) *Attorney, Agent, or Firm* — Patterson + Sheridan, LLP (57) ABSTRACT

A method for controlling a wind power plant connected to an electrical grid, the wind power plant comprising at least one wind turbine generator and a power plant controller, the power plant controller comprising a signal controller for controlling an electrical parameter with a gain, the method comprising, measuring at least one electrical parameter in the electrical grid, determining an internal signal value at least partially based on the at least one electrical parameter, comparing the internal signal value with a saturation value, and if the internal signal value exceed the saturation value, increasing the gain of the signal controller to a first gain value, in order to decrease a rise time for a slope for the electrical parameter in the electrical grid.

19 Claims, 5 Drawing Sheets

(51) Int. Cl.
*F03D 9/25* (2016.01)
*H02J 3/46* (2006.01)
(52) U.S. Cl.
CPC .................. *H02J 3/46* (2013.01); *Y02E 10/72* (2013.01); *Y02E 10/76* (2013.01); *Y02E 40/30* (2013.01)

(56) References Cited

U.S. PATENT DOCUMENTS

| | | | | |
|---|---|---|---|---|
| 2011/0305568 | A1* | 12/2011 | Brath | .................. F03D 7/0224 416/1 |
| 2012/0029720 | A1* | 2/2012 | Cherian | .................. H02J 13/00 700/297 |
| 2012/0205981 | A1 | 8/2012 | Varma et al. | |
| 2013/0026756 | A1 | 1/2013 | Andresen et al. | |
| 2013/0300118 | A1 | 11/2013 | Bech | |

FOREIGN PATENT DOCUMENTS

| | | |
|---|---|---|
| CN | 103280814 A | 9/2013 |
| CN | 103326368 A | 9/2013 |
| EP | 2605356 A1 | 6/2013 |
| EP | 2605357 A1 | 6/2013 |
| WO | 2012/041326 A2 | 4/2012 |
| WO | 2015078473 A1 | 6/2015 |

OTHER PUBLICATIONS

International Search Report for PCT/DK2014/050366, dated Feb. 26, 2015.
Chinese Office Action for Application No. 201480064918.0 dated Sep. 18, 2018.
Chinese Office Action for Application No. 201480064918.0 dated Dec. 12, 2017.
Chinese Office Action for Application No. 201480064918.0 dated Jan. 29, 2019.
Chinese Office Action for Application No. 201480064918.0 dated May 10, 2019.
Intellecutal Property India First Examination Report for Application No. 201617021420 dated Oct. 23, 2019.

* cited by examiner

WIND POWER PLANT WITH IMPROVED RISE TIME

The present invention relates to a power plant controller, arranged for improving the voltage rise time of a wind power plant in an electrical grid, wherein the wind power plant comprises a plurality of wind turbine generators. Further, the present invention relates to a wind power plant comprising a power plant controller of the above-mentioned sort, and to a method for controlling a wind power plant connected to an electrical grid

BACKGROUND OF THE INVENTION

A wind power plant usually has a plurality of wind turbines for converting wind energy to electricity. To supply electricity to the electricity end users, the wind power plant is connected to a power grid. However, before the wind power plant can be connected to a power grid, the wind power plant has to meet the requirements of electrical performance of the wind power plant specified by grid codes. One requirement is an initial response time of the wind power plant for various parameters such as voltage, frequency, active power and reactive power.

A wind power plant is often referred to as a group of wind turbine generators which are commonly connected to an electrical grid through a common connection point, also known as Point of Common Coupling (PCC). Additionally the wind power plant may comprise a power plant controller (PPC) and/or some sort of reactive power compensation equipment, such as Static Synchronous Compensators (STATCOMs) or switch/switched capacitors, or others.

Generally, the wind power plant has a wind power plant controller which monitors a power grid voltage and compares the power grid voltage with an external setpoint. A difference between the actual power grid voltage and the external setpoint (e.g. an error signal) is used to calculate a command for reactive power production for the wind power plant. This command is sent from the wind power plant controller to the individual wind turbines which in turn will respond (e.g. produce more or less power in order to adjust the power grid voltage) upon receiving the command. The error signal may be caused by a change in the actual power grid voltage or a change in the external setpoint.

The rise time is the the time period starting upon detection of a change in the power grid voltage or a change in the external setpoint and ending as soon as the current-power injected by the actuators at the PCC reach 95% of the control reference (in some standards the way of measuring the rise time can be different, it starts from the moment the actuators start injecting until they reach 95% of the reference, note as well that 95% is indicative that the system almost reach steady state, so instead of 95%, it can be 90% or another value that can indicate that the system is almost in steady-state (measurement almost reaching the reference).

Often the power plant controller operates with some restrictions. These restrictions can be referred back to current or voltage limitations, but in practice the limits are often implemented as a restriction to the reactive power supplied from the wind power plant to the grid through a point of common coupling. This restriction can either be a hard reactive power limit with a numerical value of VAr's or p.u. or a Power Factor value, meaning that the reactive power is limited to an upper maximum defined according to the present active power production.

SUMMARY OF THE INVENTION

The object of the present invention is to provide a method and a system for improving a rise time response for a voltage slope control in a wind power plant when reactive power reference is limited by a Power Factor (PF) set point or a reactive power limits both or even other limits. Furthermore it is an object to provide a power plant controller which is capable of providing better grid support during changes in reference setpoints. In addition it is an object to provide a controller that in most situations provides a signal response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Thus, the above described object and several other objects are intended to be obtained in a first aspect of the invention by providing a method for controlling a wind power plant connected to an electrical grid, the wind power plant comprising at least one wind turbine generator and a power plant controller, the power plant controller comprising a signal controller for controlling an electrical parameter with a gain, the method comprising:
   measuring at least one electrical parameter in the electrical grid,
   determining an internal signal value at least partially based on the at least one electrical parameter,
   comparing the internal signal value with a saturation value, and
   if the internal signal value exceeds the saturation value, increasing the gain of the signal controller to a first gain value, in order to decrease a rise time for a slope for the electrical-parameter in the electrical grid.

The invention is particularly, but not exclusively, advantageous because the method improves i.e. decreases the rise time of the voltage slope of a voltage control. However due to dynamic limitation (system non-linearities, i.e. controller sampling time), when doing this change online, the gain Kgs cannot be set as high as it would be preferred in an ideal system.

Often the internal reactive variables are limited by different user defined limits such a power factor limit or maximum reactive. These limits are set on power plant level, but limits also exist on individual wind turbine generator level.

According to one embodiment of the invention the electrical parameter is a voltage parameter, current parameter or a reactive power parameter. An advantage of this embodiment is all of the above mentioned parameters affect the voltage level and thus the rise time of the voltage slope.

According to one embodiment of the invention the method further comprises:
   determining the saturation value at least partially based on a power measurement and a power factor setpoint, and
   determining the internal signal value with a limiting function set by a user limit and the saturation value.

An advantage of this embodiment is that the internal signal value is calculated based on an internal variable; with the user hard reactive power limit is applied to the internal variable.

According to one embodiment of the invention the method further comprises:
   if a difference between the internal signal value and the saturation value is larger than a first threshold value, changing the trigger state to a first state, and
   increasing the gain of the reactive power controller to a second gain value.

An advantage of this embodiment is that the trigger and the corresponding second predefined gain value.

According to one embodiment of the invention the method further comprises:
- determining a temporary saturation value at least partially based on a power measurement and a power factor setpoint,
- determining the saturation value as the minimum of the temporary saturation value and a reactive power user limit,
- if a difference between the internal signal value and the saturation value is larger than a second threshold value and the saturation value is less than a first minimum threshold value, changing the trigger state to a second state, and
- increasing the gain of the reactive power controller to a third predefined gain value.

An advantage of this embodiment is that the method finds the minimum of two internal variables and uses this in comparison with the saturation value, if the comparison is larger than the third predetermined threshold, the trigger moves to a higher state and thus a higher gain.

According to one embodiment of the invention the method further comprises:
- comparing the saturation value with a reactive power measurement in a second comparison,
- comparing the saturation value with a reactive power measurement in a third comparison,
- if a difference between the saturation value and a reactive power measurement of the second comparison is larger than a third threshold value, and a difference between the saturation value and a reactive power measurement of the third comparison is larger than a fourth threshold value, changing a trigger state to a third state, and
- increasing the gain of the reactive power controller to a fourth gain value.

An advantage of this embodiment is that the gain is changed to an even higher value.

According to one embodiment of the invention the method further comprises:
- detecting an equality of signs by comparing a sign of a first sample of the internal signal value with a sign of a second sample of the internal signal value,
- detecting if an absolute value of the internal signal value is greater than an absolute value of the saturation value,
- if the equality of signs and the absolute value of the internal signal value is greater than the absolute value of the saturation value, decreasing the gain of the reactive power controller to a base gain value).

An advantage of this embodiment is that the method can detect oscillations in the system and thus prevent the gain to be so high that it will cause oscillation. Being able to detect oscillations at an early stage also means that the system can operate with a higher gain, than what normally would be used. If oscillations are detect the gain should be changed to base gain again, which is to be understood as the gain that would be applied with the Rise time function enabled.

According to one embodiment of the invention the method further comprises:
- calculating a short circuit ratio of the wind power plant at a common point of connection in the electrical grid,
- adjusting the gain (Kgs) according to predefined function of the trigger state and the short circuit ratio.

An advantage of this embodiment is that the short circuit ratio of the electrical grid is taken into account when selecting the gain, both the present trigger state and the SCR are used in the gain adjustment.

According to one embodiment of the invention the reactive power controller is a discrete proportional-integral controller with the gain (Kgs) and an output signal, and wherein the method further comprises:
- calculating a derivative of an output signal for a first sample of the proportional-integral controller and an output signal for a second sample of the proportional-integral controller, and
- if the derivative of the output signal is negative and the gain is smaller for the second sample than the gain for the first sample, freezing the output signal of the proportional-integral controller.

An advantage of this embodiment is that the freeze structure is detecting the direction of which, output signal is growing. If the direction of output signal is decreasing, output signal is frozen if he gain was smaller than in previous sample or already in freeze mode.

According to one embodiment of the invention the internal signal value is an internal reactive power value.

According to one embodiment of the invention the method further comprises:
- comparing a sign of a first sample of the internal signal value with a sign of a second sample of the internal signal value for detecting a change in sign, and
- if the output for the first sample is less than the output of for the second sample and no change in sign is detected, freezing the output of the proportional-integral controller for the duration of one sample.

An advantage of this embodiment is that the freeze mode is only applied for the duration of one additional sample.

In a second aspect, the present invention relates to a wind power plant connected to an electrical grid, comprising at least one wind turbine generator and a power plant controller, the power plant controller is arranged to operate in a wind power plant according to a method as claimed in any of the claims 1 to 10, or to a method according to any of the embodiments described herein.

In a third aspect, the present invention relates a power plant controller arranged for controlling a wind power plant connected to an electrical grid, the wind power plant comprising at least one wind turbine generator and a power plant controller, the power plant controller comprising:
- a reactive power controller with a gain arranged to control reactive power in the wind power plant,
- equipment arranged to measure at least one electrical parameter in the electrical grid, and
- a processor unit arranged to calculate an internal signal value based on the at least one electrical parameter, and to compare the internal signal value with a saturation value in a comparison,
- a processor unit further arranged to increase the gain of the reactive power controller to a first predefined gain value, in case the internal signal value is larger than the saturation value, so as to decrease a rise time for a voltage slope for a voltage parameter in the electrical grid.

In a fourth aspect, the present invention relates to at least one computer program product directly loadable into the internal memory of at least one digital computer, comprising software code portions for performing the steps of the method according to any of claims 1 to 11 when said at least one product is/are run on said at least one computer.

The first, second, third and fourth aspect of the present invention may each be combined with any of the other aspects. These and other aspects of the invention will be apparent from and elucidated with reference to the embodiments described hereinafter.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

The controller is provided with measurement values from a point of measurement, which values are modified according to estimated values at a point of common coupling, and associated reference values (e.g. $V_{ref}$, $f_{ref}$, $Q_{ref}$ etc.) for the point of measurement. The estimated values at the point of common coupling are determined from a model of the transmission line between the point of measurement and point of common coupling, not from measured values from the point of measurement, but from the reference values supplied to the controller ($V_{ref}$, $f_{ref}$, $Q_{ref}$ etc.). At steady state, the reference values are equivalent with the measured values.

The embodiments of the present invention pertain to a power plant controller of a wind power system with a plurality of wind turbine generators. The power plant controller is arranged to improve the rise time of the voltage level or the reactive power in a wind power plant.

In the past PF-Q limits problem has been neglected, as time response requirements didn't apply for wind power generation, therefore it is important to provide solutions which provide this control functions to power plant controllers as well.

The wind turbine generator which supplies power to an electric grid may be equipped with regulation capacity against voltage level, grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind power plant grid".

A variable speed wind turbine generator, which is used in at least one of the described embodiments and which is capable for being connected to an electrical grid 20 is equipped with the control system described. It comprises a rotor with a hub 3 and at least one blade 4 mounted to the rotor as discussed above. The rotor is connected, for example via a main shaft, to a generator 12 for translating the torque of the rotor into electrical power. In some embodiments, a gearbox is interconnected between the rotor and the generator in order to translate the rotational speed of the rotor into a higher speed for the generator.

Figure 1:
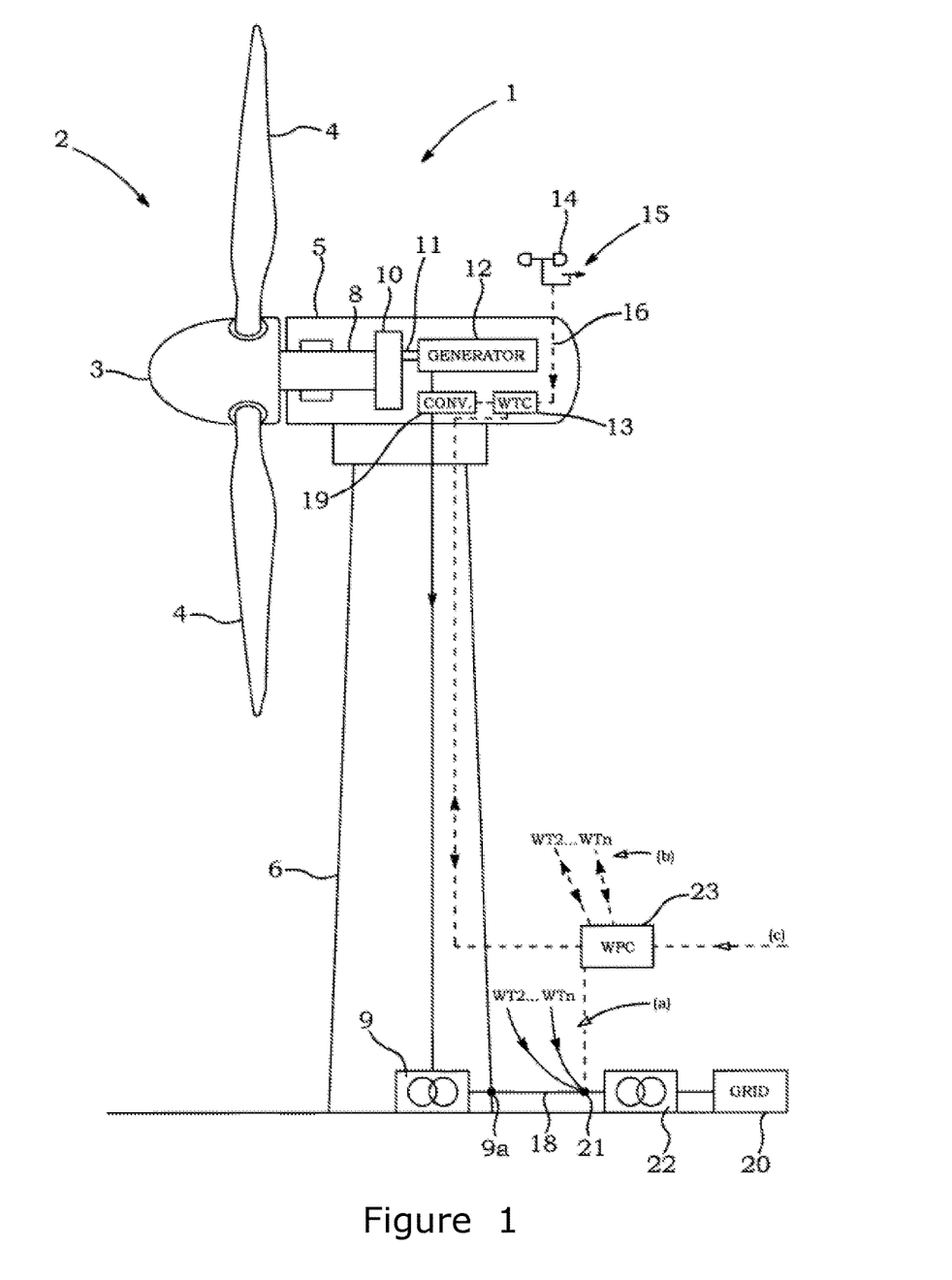
FIG. 1 shows a general structure of a wind turbine.

FIG. 1 shows, an exemplary variable-speed wind turbine generator (WT) 1 is one of a plurality of wind turbine generators of a wind power plant (WPP). It has a rotor 2 with a hub 3 to which, e.g., three blades 4 are mounted. The pitch angle of the rotor blades 4 is variable by means of pitch actuators. The rotor 3 is connected to a nacelle 5 supported by a tower 6 and drives a generator 12 via a main shaft 8, a gearbox 10, and a high speed shaft 11. This structure is exemplary; other embodiments, for example, use a direct-drive generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant is fed into a wind power plant grid 18 (symbolized by "a" in FIG. 1). The internal wind power plant grid 18 is connected at a point of common coupling 21 and an optional further step up transformer 22 to a wind power plant external electrical utility grid 20. The grid 20 is equipped with various regulation capacity against grid fluctuations, e.g. in the form of conventional producers which can increase and lower production on a short-time scale to control voltage and frequency.

A control system includes a wind-turbine controller 13 and a power plant controller 23. The power plant controller 23 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller, e.g. an instruction to provide a certain amount of reactive power in addition to the active power, etc. The power plant controller 13 uses different input signals to perform its control tasks, for example signals representing current wind conditions (e.g. from an anemometer 14 and a wind vane 15 transmitted via line 16), feed-back signals representing pitch angle, rotor position, amplitudes and phases of the voltage and current at the generator 12 and the terminals 9a, etc., and command signals from the power plant controller 23. The power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the power plant controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the power plant controller's limit-fluctuation command. Thus, in the exemplary embodiment of FIG. 1 the control task of the control system to limit output fluctuations is shared by the power plant controller 23 and the wind-turbine controller 13. In other embodiments this control task is performed by the wind turbine controller 13 alone; in those embodiments, the "control system" is represented just by the wind turbine controller 13, without a power plant controller 23.

Figure 2:
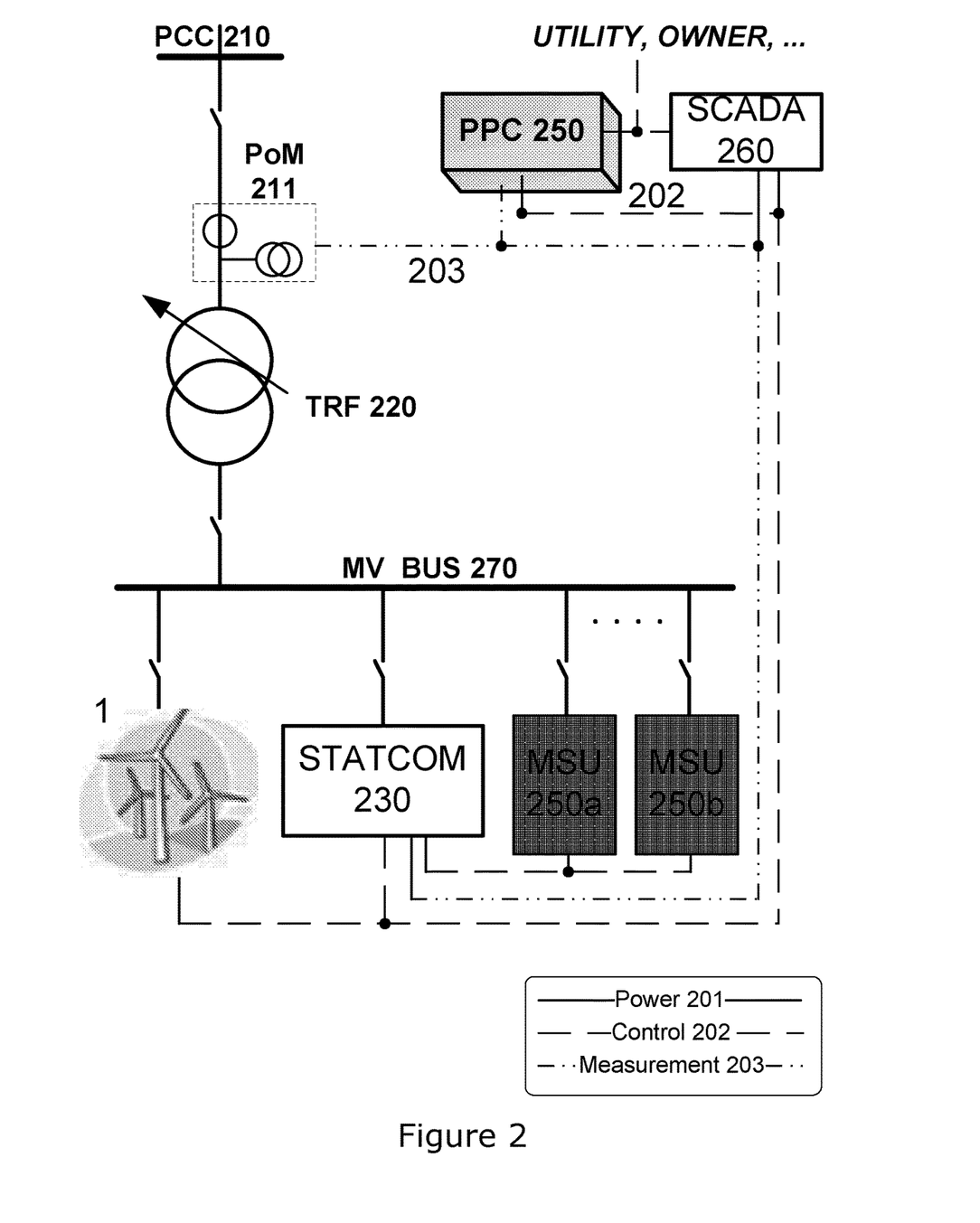
FIG. 2 shows a wind power plant according to the present invention.

FIG. 2 shows the relevant communication/control links 202 and measurement signals 203. The PPC 250 objective is to fulfil the grid code requirement at the PCC 210 regarding plant electrical performance. Therefore the PoM 211 for three-phase voltages and currents coincides in most of the cases with the PCC 210, unless there are very long distances between the PCC and the location of the PPC 250. The PCC 250 placement can also vary according to the specific project requirements.

The PPC, as the main controller of the WPP, takes care of the power control loops, such as voltage, reactive power and frequency controls by using the reference targets sent by, for instance, the grid operator. The PPC 250 further dispatches the active power and reactive power references to the turbines and the reactive power references to the turbines and the additional reactive power compensation equipment.

The PPC 250 and the SCADA system 260 include several possibilities for data integration to owners and utilities. Through these data interfaces 202, customers and utilities can receive online information regarding the operational state of the wind power plant, for instance:

Produced active power
Available active power
Wind speed
Wind direction
Possible inductive capability
Possible capacitive capability
Number for operational turbines.

Similarly, it is possible to send setpoints for all wind power plant control loops including:

Wind power plant active power setpoint
Wind power plant frequency setpoint
Wind power plant reactive power setpoint
Wind power plant voltage setpoint
Wind power plant power factor setpoint FIG. 2 also shows an example of WPP architecture where the MSUs 250 are controlled solely by the STATCOM 230. Alternatively, the PPC can control MSUs if the power plant does not include a STATCOM. Various other equipment, such as instrumentation, switchgear, power meter and protection relay, is not shown in this example for the sake of simplicity.

The Power Plant Controller (PPC) 250 is based on a programmable automation controller. This platform allows the PPC to communicate with remote modules, including multiple communication modules for fast parallel communication with turbines and substation equipment thereby communicating with additional devices which have an Ethernet communication link. A communication protocol is integrated with the PLC, targeting the WTGs within the power plant. The main control signals transmitted via the protocol are the active and reactive power setpoints, the available active and reactive power and status signals of the turbines.

A power meter (not shown in the Figures) is usually located in the PPC or can be remotely connected by a dedicated fast-optical fibre communication channel. Apart from some filtering functions, the power meter calculates the rms values of the feedback signals received from the sensors (PoM) 211. In addition, the power meter can record grid events, such as faults.

The reactive power compensation equipment is possible to be installed on the MV busbar 270 of the substation to increase available reactive power in the power plant. The solution of reactive power compensation by utilizing additional equipment depends on project-specific analysis of the existing requirements. For instance, the STATCOM will be used when the Q-V requirements at the PCC implies high dynamic performance, otherwise MSUs can be used. In most of the cases the STATCOM is complemented by MSU devices, in which case the STATCOM must be configured to control them.

Figure 3:
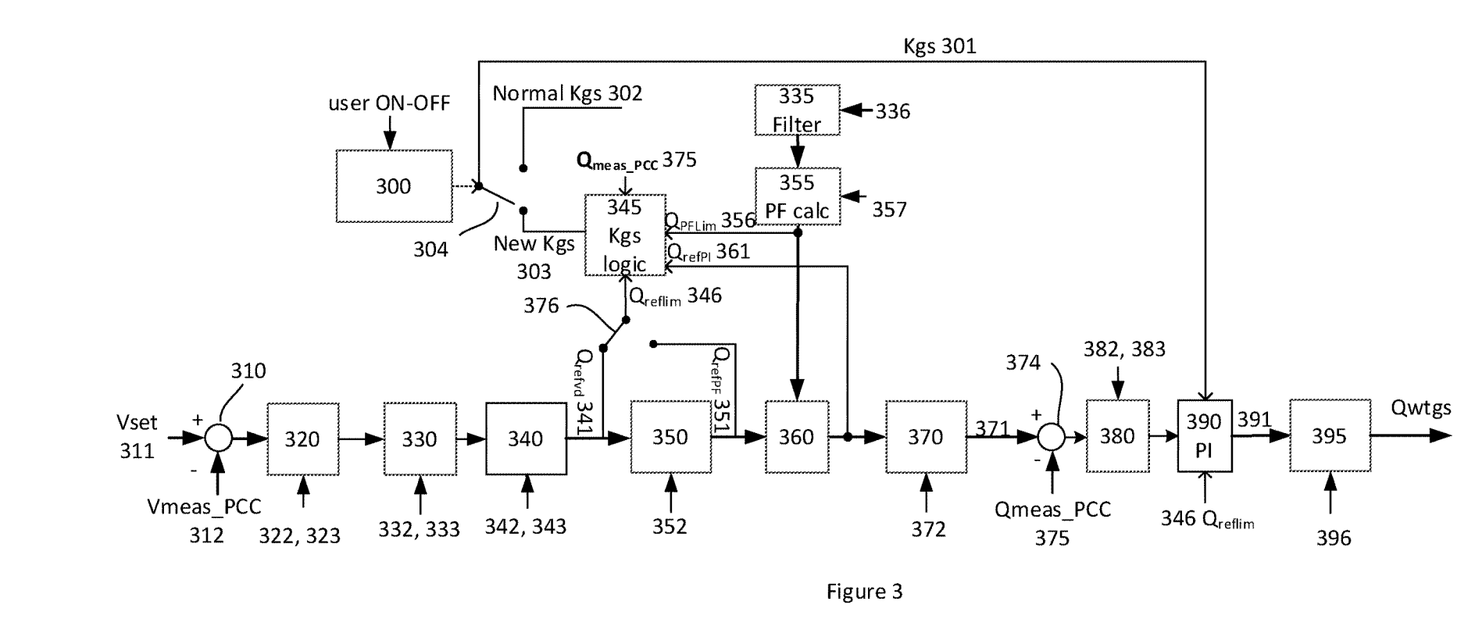
FIG. 3 shows the control diagram according to the present invention.

FIG. 3 shows a control diagram of an embodiment of the present invention. Left side shows the input voltage variable Vmeas_PCC 312 and the voltage set point Vset 311 both compared in the comparator 310. The error of the comparator 310 is feed to a Hard voltage limit block 320, this block receives two control values user max Verror(+) 322 and user max Verror(−) 323, the purpose of the user max Verror(+/−) 322 323 is to ensure a smooth control of the grid voltage. The output of block 320 is then feed to a deadband block 330, this block also has two control values user dead-band (+) 332 and user dead-band(−) 333, the dead-band block 330 exclude voltage control around a narrow deadband defined by user dead-band(+) 332 and user dead-band(−) 333.

The droop control block 340 receives the output of the deadband block 330. The droop control block receives two set points user Droop(+) 342 and user Droop(−) 343, which defines the droop function. The droop block 340 translates the relationship between voltage and reactive power of the wind power plant, thus the output 341 of the droop block 340 is also called Qrefvd 341, as this is the reactive power reference according to the voltage droop control.

The block in line is the Hard Q limit block 350, here the limitation of reactive power for the WPP is set in WPP Q user limit 352. Whenever the Qrefvd 341 is above WPP Q user limit 352 it is limited, to whatever the limit value is set at. The output of block 350 is the QrefPF 351 as this reactive power reference for the Hard Q limit (PF) block 360. This block receives a set point QPFlim value 356 from a PF calculation block in which the reactive power according to a given power factor is calculated. The PF calculation block 355 receives a filtered 335 signal of the active power measurement Pmeas 336 and PF set point, user WPP PF limits (cap-ind) 357. From that the corresponding maximum reactive power, QPFlim 356 is calculated.

The next block is the ramp rate limiter block 370, this block also has a user defined set point WPP Q user ramp-rate 372, which sets the maximum allowed rate of which reactive power can be changed. The output of the ramp rate block 370 is the Qref 371.

The reactive power reference Qref 371 and the measured reactive power value Qmeas_PCC 375 are compared in another comparator 374, the output 373 of the comparator 374 is feed to another deadband block 380. The deadband block 380 receives two user defined values user_PI_dead_band(+) 382 and user_PI_dead_band(−) 383, which defined the width of the reactive power controller deadband. The output of the dead band block 380 is used as the input in the PI controller 390.

The enable block 300 is used to receive a user input to select whether or not the improved rise function is enabled. If the improved rise time function is enabled the switch 304 swabs downward to the new Kgs 303, instead of the normal Kgs 302. The new Kgs 303 is generated in the Kgs change logic block 345.

The inputs to the Kgs change logic block 345 are the following parameters Qrefvd 341, QrefPF 351, Qmeas_Pcc 375, QPFlim 356, QrefPI 361, and Qreflim 346.

The above mentioned parameters to the Kgs change logic block 345 will in the following be explained in more details.

Normally, the Kgs is calculated according to the rise time, SCR and control type, with the proposed logic it will be changed according to some other conditions when reaching saturation due to PF-Q limits.

Basically, the following signals are observed to decide the change in Kgs:

QPFLim: Q limits calculated by the PF limit block 356
Qrefvd: WPP Q user limits 341
QrefPF: Q reference after the hard limiter block 351
QrefPI: Q reference after the PF limiter block 361

Basically, the "Kgs Change Logic" block 345 is composed with a set trigger functions (explained further in the following sections):

Trigger: compares the QrefPI 361, and Qrefvd 341, to decide if the gain Kgs 301 should be changed to a second gain value.

Trigger 1: compares the QPFLim 356 and Qrefvd 341, and also the QPFLim 356 with a fixed value to decide if the gain Kgs 301 should be changed to a third gain value.

Trigger 2: compares the QPFLim 356 and Qrefvd 341 and the QPFLim 356 with a second fixed value to decide if the gain Kgs 301 should be changed to a fourth gain value.

Oscillations Detector: compares the QPFLim 356 and Qrefvd 341 to decide if the gain Kgs 301 should be changed to normal again. Basically the Qrefvd 341 should not change sign between two consecutives samples and being above the QPFLim 356 at the same Q For all the above triggers the signal QrefPF 351 can be used instead of Qrefvd 341, this depends on whether block 350 is enabled by setting a WPP Q user limit 352. The selector 376 ensures that the right internal signal value 341, 351 is used depending on the other parameters. The parameters QPFLim 356 and QrefPI 361 are seen as saturation values.

The output of the Proportional-Integral controller 390 is fed to Hard Q limit block 395, which selects a minimum of the following values: WPP $Q_{ind\text{-}Cap\text{-}Available}$ and Quser. The last output of block 395 is the aggregated reactive power reference for the wind power plant.

Normally the aggregated reactive power reference is split among the plurality of WTGs in the wind power plant and individual references are dispatched to each WTG.

The idea behind the present invention is that any kind of control that saturates the error can benefit from the principle of the invention.

In different examples, the input to the controller is the variable to be controlled at the PCC could one or more of: Q, V, or PF. The output of the controller (WTG references) independently can be in whatever form of Vref, Iqref or Qref.

The intermediate control in FIG. 3 is in form of Q control, thus allowing to limit the Q at PCC, however it may be in other forms, e.g. the intermediate reference can be a voltage signal, and in this case the voltage is limited at the PCC.

So although the claims read "reactive power" the scope of the invention should not be limited to only cover the strict wording "reactive power" as there is a close interconnection between Voltage, Reactive Power and quadrature Current. In the example explained in FIG. 3 is the internal signal value a reactive power value.

Thus the general concept is that if the error or the reference to the intermediate controller is saturated (note that this is the same as saturating the error) the controller will not see the dynamics of the error thus becoming slower. To solve that when the saturation is reached the gain of the control can be increased.

In the following actual examples of trigger implementations will be shown.

The gain value Kgs is set according to the selected trigger.

The index "k" and "k−1" refers to the sample number, so "k−1" is the previous sample compared to "k".

The oscillations detector logic works as follows:
IF (sign of $Q_{reflim\ k}$ changes with respect to $Q_{reflim\ k-1}$) AND $(ABS(Q_{reflim\ k}) \geq ABS(Q_{refPI\ k}))$ AND $(ABS(Q_{reflim\ k-1}) = ABS(Q_{refPI\ k-1})$
  THEN Oscillation$_k$=1
  ELSE Oscillation$_k$=0

The following logic is applied to activate the "Trigger".
IF $(ABS(Q_{reflim\ k}) = \text{constant} + ABS(Q_{refPI\ k}))$ AND (Oscillation$_k$=0) AND (Oscillation$_{k-1}$=0)
  THEN Trigger$_k$=1
  Kgs=gain01
IF $(ABS(Q_{reflim\ k}) = ABS(Q_{refPI\ k}))$ OR (Oscillation$_k$=1)
  THEN Trigger$_k$=0
  Kgs=gain02

The following logic is applied to activate the "Trigger1". Here there is a clear distinguishing between inductive (ind) or capacitive (cap) mode.
$Q_{lim\_ind\ k} = MIN(ABS(Q_{PFlim\_ind\ k}), ABS(Q_{WPPlim\_ind\ k}))$
$Q_{lim\_cap\ k} = MIN(Q_{PFlim\_cap\ k}, Q_{WPPlim\_cap\ k})$
IF $(Q_{reflim\ k} \geq 0)$ THEN
  IF $(Q_{reflim\ k} - Q_{lim\_cap\ k} = \text{constant3})$ AND (Trigger$_k$=1) AND $(Q_{lim\_cap\ k} < \text{constant4})$
    THEN Trigger1$_k$=1
    Kgs=gain1
  ELSE Trigger1$_k$=0
    Kgs=gain2
ELSE $(Q_{reflim\ k} < 0)$
  IF $(ABS(Q_{reflim\ k}) - ABS(Q_{lim\_ind\ k}) = 0.4)$ AND (Trigger$_k$=1) AND $(ABS(Q_{lim\_ind\ k}) < \text{constant5})$
    THEN Trigger1$_k$=1
    Kgs=gain3
  ELSE Trigger1$_k$=0
    Kgs=gain4

The hysteresis for Trigger1 is done as follows:
IF $(Q_{reflim\ k} \geq 0)$ THEN
  IF (Trigger1$_{k-1}$=1) AND (Trigger$_k$=1) AND $((Q_{reflim\ k} - Q_{lim\_cap\ k}) = \text{constant10})$ AND $(Q_{lim\_cap\ k} < \text{constant11})$
    THEN Trigger1$_k$=gain5
ELSE (Qreflim k<0)
  IF (Trigger1$_{k-1}$=1) AND (Trigger$_k$=1) AND $((ABS(Q_{reflim\ k}) - ABS(Q_{lim\_ind\ k}) = \text{constant20})$ AND $(ABS(Q_{lim\_ind\ k}) < \text{constant21})$ THEN Trigger1$_k$=1

The following logic is applied to activate the "Trigger2".

IF (Q$_{reftim\ k}$≥0) THEN

IF ((ABS(Q$_{meas\_PCC}$ k)+constant30)<Q$_{lim\_cap\ k}$) AND (Trigger$_k$=1) AND (Q$_{lim\_cap\ k}$-ABS (Q$_{meas\_PCC\ k}$))=constant31 AND (no sign change in Q$_{meas\_PCC\ k}$ compare to Q$_{meas\_PCC\ k-1}$) AND (Q$_{reftim\ k}$-Q$_{lim\_cap\ k}$=constant32)

THEN Trigger2$_k$=1

Kgs=Vslope_variable *SCR+constant40

ELSE Trigger2$_k$=0

Kgs=gain6

ELSE (Q$_{reftim\ k}$<0)

IF ((ABS(Q$_{meas\_PCC\ k}$)+constant50)<ABS(Q$_{lim\_ind\ k}$)) AND (Trigger$_k$=1) AND (ABS(Q$_{lim\_ind\ k}$)-ABS (Q$_{meas\_PCC\ k}$))=constant51 AND (no sign change in Q$_{meas\_PCC\ k}$ compare to Q$_{meas\_PCC\ k-1}$) AND ((ABS (Q$_{reftim\ k}$)-ABS(Q$_{lim\_ind\ k}$)=constant52)

THEN Trigger2$_k$=1

Kgs=Vslope_variable*SCR+constant53

ELSE Trigger2$_k$=0

Kgs=gain7

The slope_variable is depended on the actual voltage slope in the system.

The hysteresis for Trigger2 is done as follows:

IF (Q$_{reftim\ k}$≥0) THEN

IF (((Q$_{lim\_cap\ k}$-ABS(Q$_{meas\_PCC\ k}$))=constant60 AND (Trigger2$_{k-1}$=1) AND (Trigger$_k$=1) AND (Trigger1$_k$=0))

THEN Trigger2$_k$=1

ELSE (Q$_{reftim\ k}$<0)

IF ((ABS(Q$_{lim\_ind\ k}$)-ABS(Q$_{meas\_PCC\ k}$))=constant61 AND (Trigger2$_{k-1}$=1) AND (Trigger$_k$=1) AND (Trigger1$_k$=0))

THEN Trigger2$_k$=1

The gain value Kgs used in the PPC is dependent on the short circuit ratio (SCR), rise time and Vslope values. The gain value Kgs is set according to the selected trigger.

In an example with the Triggers implemented as described above the gain is calculated.

The following equations applies, where Kpv is the gain of the droop voltage controller Slope=Vslope [%]

Kpv=(100*QavarageCapacitive)/Slope

Kgs=SCR/(SCR+Kpv)

Figure 5:
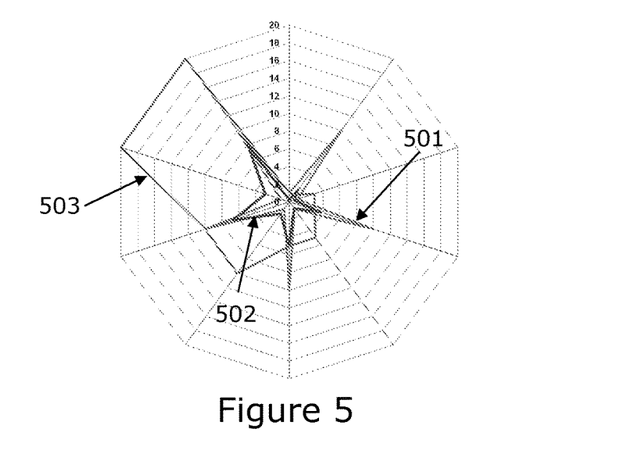
FIG. 5 shows a web diagram of the relationship between the SCR and controller gain value Kgs.

FIG. 5 shows the relationship obtained between the SCR, rise time and the Vslope value. It can be seen that Kgs ranks between 0-1. Also that the larger the SCR is the larger is the gain value Kgs.

Ideally, when the system is in saturation the Kgs should have a value equal to one, since the Vslope and grid will not have any impact in the error, this error is the reference to the Q loop (Qref).

When the PI controller has a transition due to a change of the gain online, the error of the Q$_{PI}$ can't zero, this could drive the system to have some swinging when changing the gains, especially for grids with low SCR.

To avoid the aforementioned problem, the Kgs is not set to 1 when in saturation conditions; instead an experimental value of the Kgs is obtained when in saturation conditions.

The actual gain Kgs is implemented in the PI controller 390, where the gain value Kgs 301 affects both proportional gain and the integral gain.

In an embodiment the PI controller is implemented in the discrete form in the PPC according to the equations below.

Figure 6:
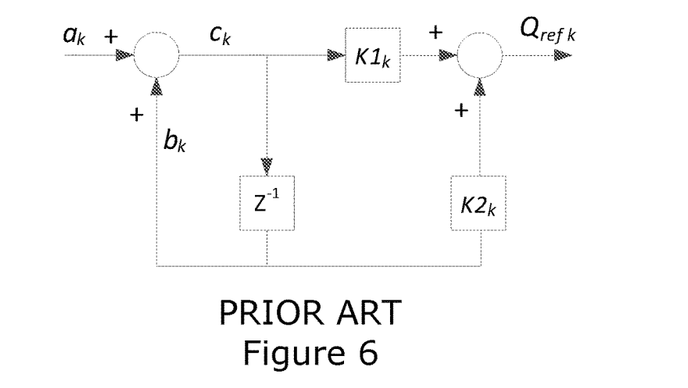
FIG. 6 shows the PI controller diagram.

FIG. 6 shows how a PI controller is implemented in discrete form according to the prior art.

Where the gains K1 and K2 are calculated according to the current Kgs, WTG type and rise time value.

If the values of the K1 and K2 are going to be changed online, the following implementation of the PI is needed to have a soft transition:

$$b_k = \frac{K1_{k-1} + K2_{k-1}}{K1_k + K2_k} C_{k-1}$$

$$c_k = a_k + b_k$$

$$K1_k = b01 * Kgs_k$$

$$K2_k = b11 * Kgs_k$$

$$Q_{ref\ k} = K1_k a_k + (K1_k + K2_k) \frac{(K1_{k-1} + K2_{k-1})}{(K1_k + K2_k)} C_{k-1}$$

Figure 7:
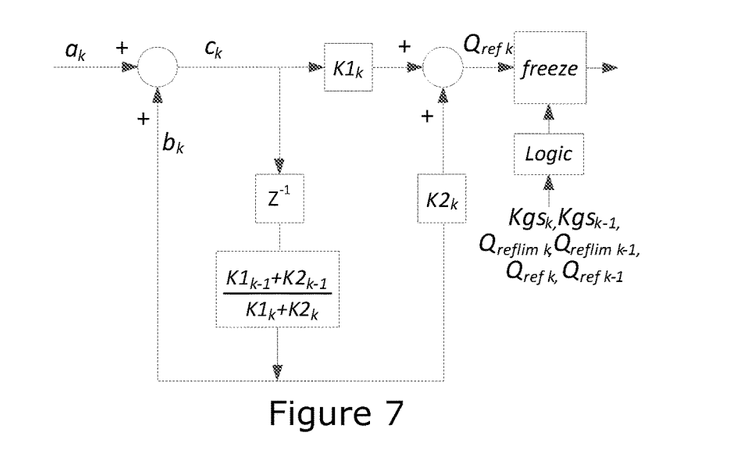
FIG. 7 shows the PI controller with initialization and freezing.

So according to the aforementioned equations the PI should have the structure as shown in FIG. 7, where the PI controller is implanted with a freeze structure. Which enable online changes in the K1 and K2 gains, without causing too many disturbances, seen from a stability point of view.

When reducing the Kgs value, the Q$_{ref}$ 391 can step down following a recovery, creating a bump in the transient response, to avoid that the freeze structure is used.

In an embodiment the freeze structure is detecting the direction of which, Q$_{ref}$ is growing. If the direction of Q$_{ref}$ is decreasing, i.e. the derivative of Q$_{ref}$ is negative; Q$_{ref}$ is frozen if the gain value Kgs 301 is smaller than in the previous sample or if it is already in the freeze mode.

There several ways to detect if Q$_{ref}$ is decreasing finding the derivative is one way, others could be comparing of two samples, but in the end they all finds the sign of the derivative.

In an embodiment Q$_{ref}$ may only be frozen maximum of 2 samples, if Q$_{ref}$ is lower than in the previous sample and no change in sign in Q$_{ref}$ is detected.

Figure 4:
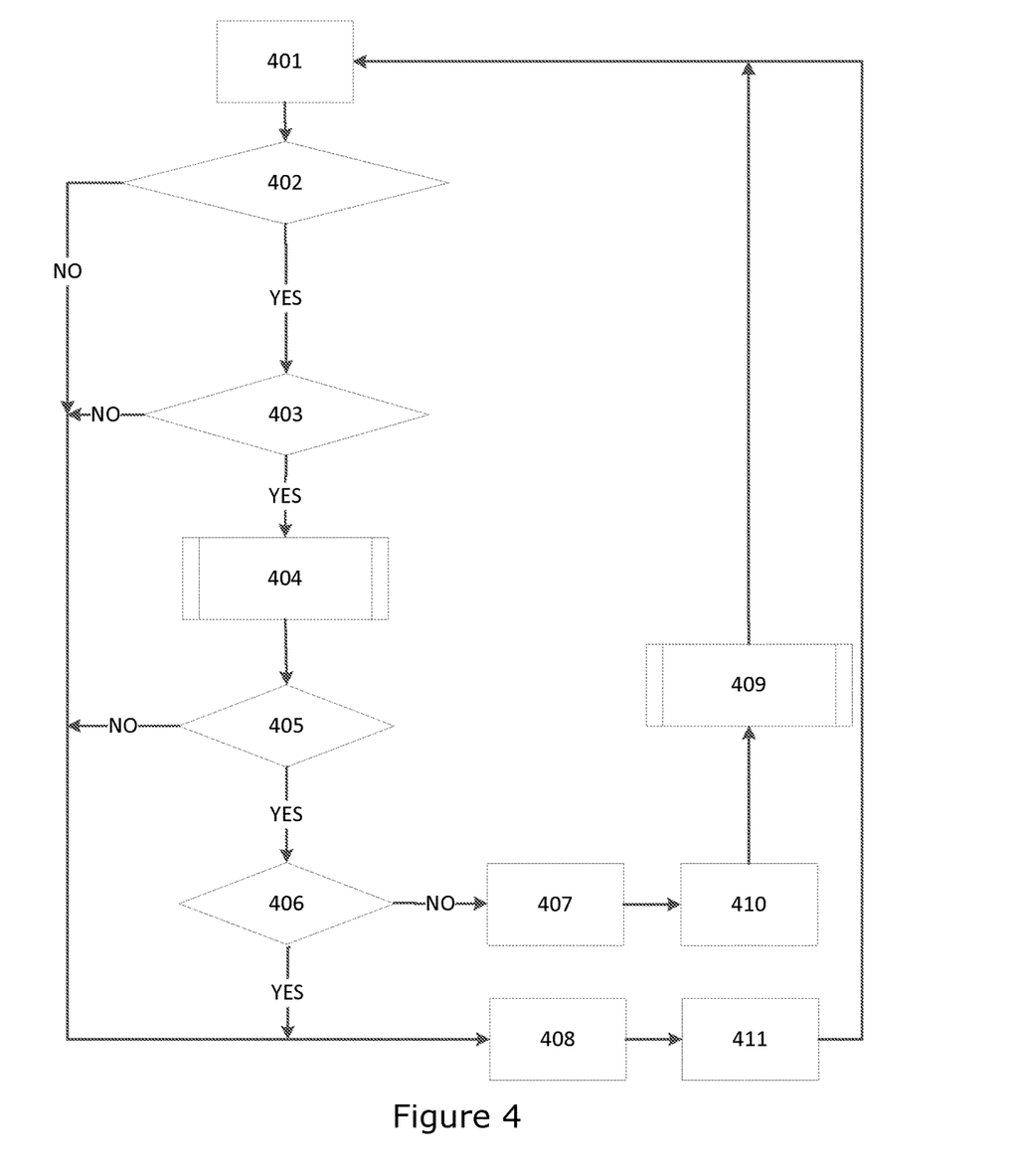
FIG. 4 shows a diagram of the logic flow chart.

FIG. 4 shows a flow chart of an embodiment of the invention.

Block 401 reads the data from a measurement or gets them from the power meter: the data are Vm Qm, Pm, Vset, Qset, Pset. In Block 402 it is detected if PPC is in Vslope, if no then exit to normal mode, if yes then continue to next block 403 which is check for whether the improved rise time function according to the invention is enabled. Following block 404 here it is decided where the input to the Kgs change logic 345 (FIG. 3) is used, as block 404 is similar to the switch 374 (FIG. 3), Block 404 checks if read Qref before the PF+Q limits, and the logic for triggers as well as logic for oscillation. The next blok 405 detects if a Trigger levels has reached and after that the block 406 System Oscillates detects if there are oscillations in the system. If no oscillations are detected Block 407 Use Larger Kgs according to trigger levels, is used. If there are oscillations Block 408 Use Normal Kgs is used. Block 410 and 411 are the implementations of the PI controllers accordingly.

The last block in the loop is the Block 409 Logic for freeze the PI output, which handles the freeze logic.

The power plant controller 350 or parts of the power plant controller may be implemented as computer program products, as electric analogue or digital circuits, or as a combination thereof. A computer program being loadable into the internal memory of at least one digital computer is executable by the computer, wherein execution/running of the program results in functions of the power plant controller 350 being carried out, or in that the steps of a method of an embodiment of the invention are performed.

In summary the invention relates to a method for controlling a wind power plant connected to an electrical grid (20), the wind power plant comprising at least one wind turbine generator (1) and a power plant controller (250), the power plant controller comprising a signal controller (390) for controlling an electrical parameter with a gain (Kgs), the method comprising, measuring at least one electrical parameter (312) in the electrical grid (20), determining an internal signal value (346) at least partially based on the at least one electrical parameter (312), comparing the internal signal value (346) with a saturation value (356), and if the internal signal value (346) exceed the saturation value, increasing the gain (Kgs) of the signal controller to a first gain value, in order to decrease a rise time for a slope for the electrical-parameter in the electrical grid (20).

The invention also relates to a power plant controller arranged to decrease a rise time for a voltage slope for a voltage parameter in the electrical grid (20).

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method for controlling a wind power plant connected to an electrical grid, the wind power plant comprising at least one wind turbine generator and a power plant controller, the power plant controller comprising a signal controller with a gain (Kgs), the method comprising:
   measuring at least a first electrical parameter of the electrical grid,
   determining an internal signal value at least partially based on the first electrical parameter,
   comparing the internal signal value with a reactive power saturation value, and
   responsive to the internal signal value exceeding the reactive power saturation value, increasing the gain (Kgs) of the signal controller to a first gain value,
   wherein a rise time for a slope for the first electrical parameter is decreased.

2. The method according to claim 1, wherein the first electrical parameter is one of a voltage parameter and a current parameter.

3. The method according to claim 1, further comprising:
   determining the reactive power saturation value at least partially based on a power measurement and a power factor setpoint, and
   determining the internal signal value with a limiting function set by a user limit and the reactive power saturation value.

4. The method according to claim 3, further comprising:
   responsive to a difference between the internal signal value and the reactive power saturation value being larger than a first threshold value, changing a trigger state to a first state, and
   increasing the gain (Kgs) of the signal controller to a second gain value.

5. The method according to claim 4, further comprising:
   determining a temporary reactive power saturation value at least partially based on a power measurement and a power factor setpoint,
   determining the reactive power saturation value as the minimum of the temporary reactive power saturation value and a reactive power user limit,
   responsive to a difference between the internal signal value and the saturation value being larger than a second threshold value, and the reactive power saturation value being less than a first minimum threshold value, changing the trigger state to a second state, and
   increasing the gain (Kgs) of the signal controller to a third gain value.

6. The method according to claim 5, further comprising:
   comparing the reactive power saturation value with a reactive power measurement in a second comparison,
   comparing the reactive power saturation value with a reactive power measurement in a third comparison,
   responsive to a difference between the reactive power saturation value and a reactive power measurement of the second comparison being larger than a third threshold value, and a difference between the reactive power saturation value and a reactive power measurement of the third comparison being larger than a fourth threshold value, changing the trigger state to a third state, and
   increasing the gain (Kgs) of the signal controller to a fourth gain value.

7. The method according to claim 1, further comprising:
   detecting an equality of signs by comparing a sign of a first sample of the internal signal value with a sign of a second sample of the internal signal value,
   detecting whether an absolute value of the internal signal value is greater than an absolute value of the reactive power saturation value, and
   responsive to the equality of signs and the absolute value of the internal signal value being greater than the absolute value of the reactive power saturation value, decreasing the gain (Kgs) of the signal controller to a base gain value.

8. The method according to claim 1, further comprising:
   calculating a short circuit ratio of the wind power plant at a common point of connection to the electrical grid, and
   adjusting the gain (Kgs) according to a predefined function of a trigger state and the short circuit ratio.

9. The method according to claim 1, wherein the signal controller is a discrete proportional-integral controller, and wherein the method further comprises:
   calculating a derivative of an output signal for a first sample of the proportional-integral controller and an output signal for a second sample of the proportional-integral controller, and
   responsive to the derivative of the output signal being negative and the gain (Kgs) is smaller for the second sample than the gain (Kgs) for the first sample, freezing the output signal of the proportional-integral controller.

10. The method according to claim 9, further comprising:
    comparing a sign of a first sample of the internal signal value with a sign of a second sample of the internal signal value for detecting a change in sign, and responsive to the output for the first sample being less than the output of for the second sample and no change in sign is detected, freezing the output of the proportional-integral controller for the duration of one sample.

11. The method according to claim 1, wherein the internal signal value is an internal reactive power value.

12. A wind power plant connectable to an electrical grid, the wind power plant comprising:
   at least one wind turbine generator; and
   a power plant controller arranged to perform an operation for controlling an electrical parameter with a gain (Kgs), the operation comprising:
      measuring at least a first electrical parameter of the electrical grid,
      determining an internal signal value at least partially based on the first electrical parameter,
      comparing the internal signal value with a reactive power saturation value, and
      responsive to the internal signal value exceeding the reactive power saturation value, increasing the gain (Kgs) to a first gain value,
      wherein a rise time for a slope for the first electrical parameter is decreased.

13. A power plant controller for controlling a wind power plant connected to an electrical grid, the wind power plant comprising at least one wind turbine generator, the power plant controller comprising:
   a reactive power controller with a gain (Kgs) arranged to control reactive power in the wind power plant,
   equipment for measuring at least a first electrical parameter of the electrical grid, and
   a processor unit configured to:
      determine an internal signal value at least partially based on the first electrical parameter,
      compare the internal signal value with a reactive power saturation value,
      increase the gain (Kgs) of the reactive power controller to a first gain value, responsive to the internal signal value exceeding the reactive power saturation value,
      wherein a rise time for a voltage slope for a voltage parameter of the electrical grid is decreased.

14. A non-transitory computer program product comprising software code portions for performing an operation for controlling an electrical parameter with a gain (Kgs) when said computer program product is run on at least one digital computer, the operation comprising:
   measuring at least a first electrical parameter of the electrical grid,
   determining an internal signal value at least partially based on the first electrical parameter,
   comparing the internal signal value with a reactive power saturation value, and
   responsive to the internal signal value exceeding the reactive power saturation value, increasing the gain (Kgs) to a first gain value,
   wherein a rise time for a slope for the first electrical parameter is decreased.

15. The computer program product according to claim 14, wherein the first electrical parameter is one of a voltage parameter and a current parameter.

16. The computer program product according to claim 14, wherein the operation further comprises:
   determining the reactive power saturation value at least partially based on a power measurement and a power factor setpoint, and
   determining the internal signal value with a limiting function set by a user limit and the reactive power saturation value.

17. The computer program product according to claim 16, wherein the operation further comprises:
   responsive to a difference between the internal signal value and the reactive power saturation value being larger than a first threshold value, changing a trigger state to a first state, and
   increasing the gain (Kgs) to a second gain value.

18. The computer program product according to claim 17, wherein the operation further comprises:
   determining a temporary reactive power saturation value at least partially based on a power measurement and a power factor setpoint,
   determining the reactive power saturation value as the minimum of the temporary saturation value and a reactive power user limit,
   responsive to a difference between the internal signal value and the reactive power saturation value being larger than a second threshold value and the reactive power saturation value being less than a first minimum threshold value, changing the trigger state to a second state, and
   increasing the gain (Kgs) to a third gain value.

19. The computer program product according to claim 18, wherein the operation further comprises:
   comparing the reactive power saturation value with a reactive power measurement in a second comparison,
   comparing the reactive power saturation value with a reactive power measurement in a third comparison,
   responsive to a difference between the reactive power saturation value and a reactive power measurement of the second comparison being larger than a third threshold value, and a difference between the reactive power saturation value and a reactive power measurement of the third comparison being larger than a fourth threshold value, changing the trigger state to a third state, and
   increasing the gain (Kgs) to a fourth gain value.

* * * * *